US011616683B2

(12) United States Patent
Rui et al.

(10) Patent No.: US 11,616,683 B2
(45) Date of Patent: Mar. 28, 2023

(54) DEEP REINFORCEMENT LEARNING-BASED INFORMATION PROCESSING METHOD AND APPARATUS FOR EDGE COMPUTING SERVER

(71) Applicant: Beijing University of Posts and Telecommunications, Beijing (CN)

(72) Inventors: Lanlan Rui, Beijing (CN); Yang Yang, Beijing (CN); Xuesong Qiu, Beijing (CN); Jingyang Yan, Beijing (CN); Zhipeng Gao, Beijing (CN); Wenjing Li, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 17/520,744

(22) Filed: Nov. 8, 2021

(65) Prior Publication Data

US 2022/0255790 A1    Aug. 11, 2022

(30) Foreign Application Priority Data

Jan. 29, 2021   (CN) .......................... 202110124288.3

(51) Int. Cl.
*H04L 41/0631*    (2022.01)
*H04L 41/16*    (2022.01)

(52) U.S. Cl.
CPC ............ *H04L 41/064* (2013.01); *H04L 41/16* (2013.01)

(58) Field of Classification Search
CPC .................................................. H04L 41/064
See application file for complete search history.

(56) References Cited

U.S. PATENT DOCUMENTS

| | | | | |
|---|---|---|---|---|
| 11,340,956 B2* | 5/2022 | Liu | .................. | G06F 9/5027 |
| 11,427,215 B2* | 8/2022 | Wang | ................ | G06F 9/5027 |
| 2019/0138356 A1* | 5/2019 | Bernat | ............... | H04L 63/0464 |
| 2019/0243438 A1* | 8/2019 | Park | .................. | G06F 1/329 |
| 2020/0296609 A1* | 9/2020 | Rayavarapu | ........ | H04W 12/06 |
| 2021/0168684 A1* | 6/2021 | Kang | ................... | H04W 36/08 |

FOREIGN PATENT DOCUMENTS

| | | |
|---|---|---|
| CN | 109788046 A | 5/2019 |
| CN | 110213097 A | 9/2019 |

* cited by examiner

*Primary Examiner* — Philip C Lee
(74) *Attorney, Agent, or Firm* — Sayramoglu Law Offices LLC

(57) ABSTRACT

A deep reinforcement learning-based information processing method includes: determining whether a target edge computing server enters an alert state according to a quantity of service requests received by the target edge computing server within a preset time period; when the target edge computing server enters the alert state, obtaining preset system status information from a preset memory library; computing an optimal action value corresponding to the target edge computing server based on a preset deep reinforcement learning model according to the preset system status information and preset strategy information; and generating an action corresponding to the target edge computing server according to the optimal action value, and performing the action on the target edge computing server. A deep reinforcement learning-based information processing apparatus for an edge computing server includes a first determining module, an acquisition module, a first computing module, a first generation module.

8 Claims, 5 Drawing Sheets

DEEP REINFORCEMENT LEARNING-BASED INFORMATION PROCESSING METHOD AND APPARATUS FOR EDGE COMPUTING SERVER

CROSS REFERENCE TO THE RELATED APPLICATIONS

This application is based upon and claims priority to Chinese Patent Application No. 202110124288.3, filed on Jan. 29, 2021, the entire contents of which are incorporated herein by reference.

TECHNICAL FIELD

The present invention relates to the field of computer technologies, and more particularly, to a deep reinforcement learning-based information processing method and apparatus for an edge computing server.

BACKGROUND

As communication technologies and Internet of Things (IoT) technologies develop, in order to meet users' requirements, a mobile device runs a growing number of mobile applications with increasingly complex functions. The mobile device is facing resource limitations, including a limited electricity quantity, capacity, and computing capability.

In view of this, mobile edge computing (MEC) is proposed to expand the resource capacity of the mobile device. A MEC server group includes a plurality of edge computing servers, and each edge computing server processes service requests in a corresponding region. However, since the edge computing server has limited computing resources, in a burst-traffic scenario, for example, when an edge computing server receives a large quantity of service requests in a short period of time, the edge computing server may have excessively high pressure, which reduces the processing efficiency of the edge computing server and further affects the stability of the processing capacity of the MEC server group.

SUMMARY

The objective of embodiments of the present invention is to provide a deep reinforcement learning-based information processing method and apparatus for an edge computing server, so as to solve the technical problem in the prior art that processing efficiency and stability of a MEC server group are reduced in burst-traffic scenarios. The present invention adopts the following specific technical solutions.

According to a first aspect, an embodiment of the present invention provides a deep reinforcement learning-based information processing method for an edge computing server, including:

determining whether a target edge computing server enters an alert state according to a quantity of service requests received by the target edge computing server with in a preset time period; if yes, obtaining preset system status information from a preset memory library, where the system status information includes processing capability information of each edge computing server in a MEC server group in which the target edge computing server is located; computing an optimal action value corresponding to the target edge computing server based on a preset deep reinforcement learning model according to the system status information and preset strategy information, where the optimal action value includes the number of an edge computing server, other than the target edge computing server in the MEC server group, to which the service requests of the target edge computing server are transferred; and generating an action corresponding to the target edge computing server according to the optimal action value, and performing the action on the target edge computing server.

Optionally, the system status information includes a system status information data group $s_i$ of the MEC server group:

$$s_i = \{c_i, v_i, w_i, d_i\}$$

where $c_i$ represents a remaining amount of resources of an $i^{th}$ edge computing server, $v_i$ represents a task processing velocity of the $i^{th}$ edge computing server, $w_i$ represents data transmission bandwidth between the $i^{th}$ edge computing server and a burst traffic server, and $d_i$ represents an average transmission delay from the $i^{th}$ edge computing server to the burst traffic server.

Optionally, the step of computing the optimal action value corresponding to the target edge computing server based on the preset deep reinforcement learning model according to the system status information and the preset strategy information includes: computing candidate action values corresponding to the target edge computing server according to the system status information and the preset strategy information by the following formula:

$$q_\pi(s, a) = E_\pi[G_t \mid S_t = s, A_t = a] = E_\pi\left[\sum_{k=0}^{\infty} \gamma^k \cdot R_{t+k+1} \mid S_t = s\right]$$

where $q_\pi$ represents a candidate action value function, $\pi$ represents the preset strategy information, $S_t$ represents current system status information, s represents current status information, a represents current action information, $A_t$ represents current action information, $E_\pi$ represents an expectation of a gain value $G_t$, k represents a quantity of times, $\gamma$ represents a reward discount factor, R represents a current reward value of a system, $G_t$ represents a current gain value of the system, t represents a count value of loop operations in the deep reinforcement learning model, and the action $\alpha$ is performed once in one loop operation; and determining the optimal action value corresponding to the target edge computing server from the candidate action values by the following formula:

$$q_\pi(s,\alpha) \leftarrow q_\pi(s,\alpha) + a \cdot [r + \gamma \cdot \max_{\alpha'} q_\pi(s',\alpha') - q_\pi(s,\alpha)]$$

where $q_\pi(s, \alpha)$ represents an optimal action value function, a represents update efficiency, r represents a currently returned reward value, $\gamma$ represents the reward discount factor, max represents a maximum value, $\max_{\alpha'} q_\pi(s',\alpha')$ represents a maximum value of Q obtained after the system performs an action corresponding to an optimal action value $\alpha'$ in a state s', s' represents status information of next loop operation, a' represents action information of next loop operation, $\pi$ represents the preset strategy information, and $\leftarrow$ represents an assignment operator.

Optionally, after the step of performing the action on the target edge computing server, the method further includes: generating system key information according to the obtained system status information and new system status information obtained after the action is performed; and storing the system key information into the memory library.

Optionally, the system key information includes a system key information data group $SS_i$:

$$SS_t = \{s_t, \alpha_t, r_t, s_{t+1}\}$$

where $\alpha_t$ represents action information, $r_t$ represents a reward value, $s_t$ represents system status information before an action $\alpha_t$ is performed, $s_{t+1}$ represents system status information after the action $\alpha_t$ is performed, t represents the count value of the loop operations in the deep reinforcement learning model, and the action $\alpha$ is performed once in one loop operation.

Optionally, after the step of storing the system key information into the memory library, the method further includes: increasing a preset value of t by 1, and then determining whether t is greater than or equal to a preset threshold N of the quantity of times and whether t is a multiple of a preset value M, where an initial value of t is 0; if yes, randomly selecting a system key information data group $SS_j$ from the memory library; computing a loss value loss according to the system key information data group $SS_j$ by the following formulas; and performing gradient descent training according to the loss value loss, and updating a parameter of the deep reinforcement learning model:

$$G_j = \begin{cases} r_j & \text{if done at step} + 1 \\ r_j + \gamma \cdot \max a' q(s_{j+1}, a'; \theta') & \text{otherwise} \end{cases}$$

$$\text{loss} = (G_j - Q(s_j, a_j; \theta))^2$$

where if a processing procedure ends in a next step, $G_j = r_j$; if the processing procedure does not end in the next step, $G_j = r_j + \gamma \cdot \max_{\alpha'} \cdot q(s_{j+1}, \alpha'; \theta')$, and $SS_j = \{s_j, \alpha_j, r_j, s_{j+1}\}$; and $G_j$ represents a target gain value, $r_j$ represents a reward value, j represents the order of a step, step represents the step, $\max_{\alpha'} q_\pi(s_{j+1}, a'; \theta')$ represents a maximum value of Q obtained after the system performs an action corresponding to an optimal action value $\alpha'$ in a state $s_{j+1}$, $s_{j+1}$ represents status information in a $(j+1)^{th}$ step, $\theta'$ represents the parameter of the deep reinforcement learning model, loss represents a loss function, $\gamma$ represents the reward discount factor, Q represents an action value function, $s_j$ represents status information in a $j^{th}$ step, and $\alpha_j$ represents action information; and if no, returning to the step of computing the optimal action value corresponding to the target edge computing server based on the preset deep reinforcement learning model according to the system status information and the preset strategy information.

Optionally, after the step of performing gradient descent training according to the loss value loss, and updating the parameter of the deep reinforcement learning model, the method further includes: determining whether the target edge computing server leaves the alert state according to the quantity of service requests received by the target edge computing server with in the preset time period; if yes, ending the processing procedure; and if no, returning to the step of obtaining the preset system status information from the preset memory library.

According to a second aspect, an embodiment of the present invention provides a deep reinforcement learning-based information processing apparatus for an edge computing server, including:

a first determining module, configured to determine whether a target edge computing server enters an alert state according to a quantity of service requests received by the target edge computing server with in a preset time period; an acquisition module, configured to obtain preset system status information from a preset memory library if the first determining module determines that the target edge computing server enters the alert state, where the system status information includes processing capability information of each edge computing server in a MEC server group in which the target edge computing server is located; a first computing module, configured to compute an optimal action value corresponding to the target edge computing server based on a preset deep reinforcement learning model according to the system status information and preset strategy information, where the optimal action value includes the number of an edge computing server, other than the target edge computing server in the MEC server group, to which the service requests of the target edge computing server are transferred; and a first generation module, configured to generate an action corresponding to the target edge computing server according to the optimal action value, and perform the action on the target edge computing server.

Optionally, the system status information includes a system status information data group $s_i$ of the MEC server group:

$$s_i = \{c_i, v_i, w_i, d_i\}$$

where $c_i$ represents a remaining amount of resources of an $i^{th}$ edge computing server, $v_i$ represents a task processing velocity of the $i^{th}$ edge computing server, $w_i$ represents data transmission bandwidth between the $i^{th}$ edge computing server and a burst traffic server, and $d_i$ represents an average transmission delay from the $i^{th}$ edge computing server to the burst traffic server.

Optionally, the first computing module specifically includes: a computing submodule, configured to compute candidate action values corresponding to the target edge computing server according to the system status information and the preset strategy information by the following formula:

$$q_\pi(s, a) = E_\pi[G_t \mid S_t = s, A_t = a] = E_\pi\left[\sum_{k=0}^{\infty} \gamma^k \cdot R_{t+k+1} \mid S_t = s\right]$$

where $q_\pi$ represents a candidate action value function, $\pi$ represents the preset strategy information, $S_t$ represents current system status information, a represents action information, $\gamma$ represents a reward discount factor, R represents a current reward value of a system, $G_t$ represents a current gain value of the system, t represents a count value of loop operations in the deep reinforcement learning model, and the action $\alpha$ is performed once in one loop operation; and a determining submodule, configured to determine the optimal action value corresponding to the target edge computing server from the candidate action values by the following formula:

$$q_\pi(s,\alpha) \leftarrow q_\pi(s,\alpha) + \alpha \cdot [r + \gamma \cdot \max_a q_\pi(s',\alpha') - q_\pi(s,\alpha)]$$

where $q_\pi(s,\alpha)$ represents an optimal action value function, $\alpha$ represents update efficiency, r represents a currently returned reward value, $\gamma$ represents the reward discount factor, max represents a maximum value, $\max_{\alpha'} q_\pi(s',\alpha')$ represents a maximum value of Q obtained after the system performs an action corresponding to an optimal action value $\alpha'$ in a state s', s' represents status information of next loop operation, a' represents action information of next loop operation, $\pi$ represents the preset strategy information, and $\leftarrow$ represents an assignment operator.

Optionally, the apparatus further includes: a second generation module, configured to generate system key information according to the obtained system status information and new system status information obtained after the action is performed; and a storage module, configured to store the system key information into the memory library.

Optionally, the system key information includes a system key information data group $SS_t$:

$$SS_t = \{s_t, \alpha_t, r_t, s_{t+1}\}$$

where $\alpha_t$ represents action information, $r_t$ represents a reward value, $s_t$ represents system status information before an action $\alpha_t$ is performed, $s_{t+1}$ represents system status information after the action $\alpha_t$ is performed, t represents the count value of the loop operations in the deep reinforcement learning model, and the action $\alpha$ is performed once in one loop operation.

Optionally, the apparatus further includes: a second determining module, configured to increase a preset value of t by 1, and then determine whether t is greater than or equal to a preset threshold N of a quantity of times and whether t is a multiple of a preset value M, where an initial value of t is 0;

a second computing module, configured to randomly select a system key information data group $SS_j$ from the memory library if the second determining module determines that t is greater than or equal to the preset threshold N of the quantity of times and t is the multiple of the preset value M; compute a loss value loss according to the system key information data group $SS_j$ by the following formulas; and perform gradient descent training according to the loss value loss, and update a parameter of the deep reinforcement learning model:

$$G_j = \begin{cases} r_j & \text{if done at step} + 1 \\ r_j + \gamma \cdot \max a' q(s_{j+1}, a'; \theta') & \text{otherwise} \end{cases}$$

$$\text{loss} = (G_j - Q(s_j, a_j; \theta))^2$$

where if a processing procedure ends in a next step, $G_j = r_j$; if the processing procedure does not end in the next step, $G_j = r_j + \gamma \cdot \max \alpha' \cdot q(s_{j+1}, \alpha'; \theta')$, and $SS_j = \{s_j, \alpha_j, r_j, s_{j+1}\}$; and $G_j$ represents a target gain value, $r_j$ represents a reward value, j represents the order of a step, step represents the step, $\max_a q_\pi(s_{j+1}, a'; \theta')$ represents a maximum value of Q obtained after the system performs an action corresponding to an optimal action value $\alpha'$ in a state $s_{j+1}$, $s_{j+1}$ represents status information in a $(j+1)^{th}$ step, $\theta'$ represents the parameter of the deep reinforcement learning model, loss represents a loss function, $\gamma$ represents the reward discount factor, Q represents an action value function, $s_j$ represents status information in a $j^{th}$ step, and $\alpha_j$ represents action information; and a first returning module, configured to return to the first computing module if the second determining module determines that t is less than the preset threshold N of the quantity of times, or t is not the multiple of the preset value M.

Optionally, the apparatus further includes: a third determining module, configured to determine whether the target edge computing server leaves the alert state according to the quantity of service requests received by the target edge computing server with in the preset time period; an end module, configured to end the processing procedure if the third determining module determines that the target edge computing server leaves the alert state; and a second returning module, configured to return to the acquisition module if the third determining module determines that the target edge computing server does not leave the alert state.

The embodiments of the present invention have the following advantages:

In the deep reinforcement learning-based information processing method and apparatus for the edge computing server according to the embodiments of the present invention provide, when receiving a large quantity of service requests in a short period of time, the target edge computing server enters the alert state. In the alert state, the action value is computed through the preset deep reinforcement learning model, and the action corresponding to the action value is performed to transfer the received service requests to other edge computing server in the MEC server group in which the target edge computing server is located for processing. This reduces the pressure of the target edge computing server and improves the processing efficiency of the target edge computing server, so as to ensure the high efficiency and stability of the MEC server group.

Certainly, implementation of any product or method of the present invention does not necessarily need to achieve all of the foregoing advantages at the same time.

BRIEF DESCRIPTION OF THE DRAWINGS

In order to describe the technical solutions in the embodiments of the present invention or in the prior art more clearly, the following briefly describes the drawings used in the embodiments or the prior art. Apparently, the drawings in the following description show merely some embodiments of the present invention, and those having ordinary skill in the art may still derive other drawings from these drawings with out creative efforts.

DETAILED DESCRIPTION OF THE EMBODIMENTS

Figure 1:
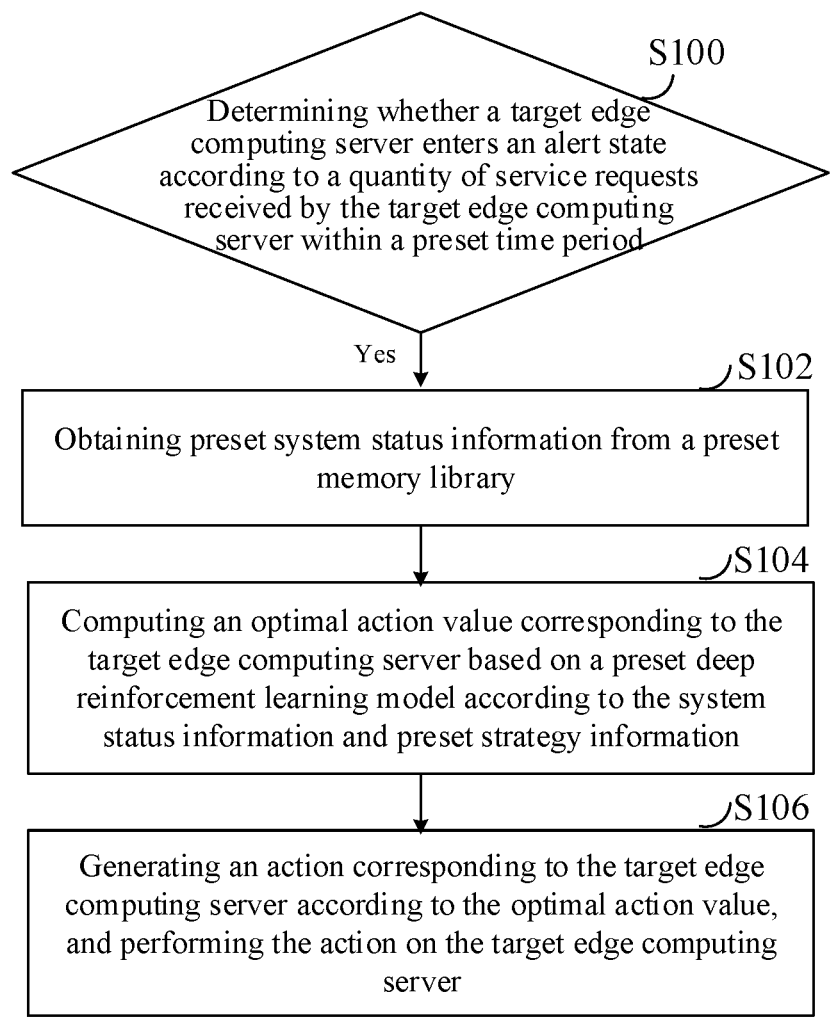
FIG. 1 is a first flow chart of a deep reinforcement learning-based information processing method for an edge computing server according to an embodiment of the present invention.

The technical solutions of the embodiments of the present invention are clearly and completely described below with reference to the drawings. Apparently, the described embodiments are merely a part, rather than all, of the embodiments of the present invention. All other embodiments obtained by those having ordinary skill in the art based on the embodiments of the present invention without creative efforts shall fall within the scope of protection of the present invention.

As communication technologies and IoT technologies develop, in order to meet user requirements, a mobile device runs a growing number of mobile applications with increasingly complex functions. The mobile device is facing resources limitations, including a limited electricity quantity, capacity, and computing capability.

In view of this, MEC is proposed. Although MEC expands a resource capacity of the mobile device, due to limited computing resources of a MEC server, the processing capability of the MEC server may be unstable when a status of a service request generation area or a total quantity of service requests changes. Therefore, it is desirable to solve the problem of ensuring efficient and stable processing performance of the MEC server in burst-traffic scenarios.

To solve the foregoing problem, two related patents are found through search: patent 1 with patent No. 201811637049.2 and patent 2 with patent No. 201910470659.6.

Patent 1 proposes a multi-strategy edge computing resource scheduling method based on an improved artificial bee colony algorithm. The improved artificial bee colony algorithm is used to give full play to the advantage of elastic expansion of an edge computing platform such that a selection range of edge node servers is no longer limited. In addition, the improved artificial bee colony algorithm effectively is introduced to avoid that a certain candidate edge node server is frequently selected for container scheduling and thus is overloaded, thereby implementing load balancing among all candidate edge node servers and enhancing system availability and stability.

However, the artificial bee colony algorithm adopted in patent 1 is difficult to apply to management and scheduling in scenarios of sudden resource shortage. Therefore, when computing resources of edge computing servers are scarce in burst-traffic scenarios, patent 1 that adopts the artificial bee colony algorithm cannot handle such cases well.

Patent 2 proposes an edge service provision optimization method based on dynamic resource allocation. This patent innovatively proposes a quantization strategy of user experience quality for service provision optimization in an edge computing framework, and proposes a dynamic resource allocation strategy to provide a new feasible and reliable method for an edge computing service provision optimization plan that utilizes distributed characteristics of services. This patent considers interaction information between a service user and an edge computing server, and also comprehensively considers a resource-performance relationship between resources and a service processing capability of the edge computing server and a time sequence relationship of service requests, and further uses the information to assist in a dynamic adjustment strategy when the edge computing server is running. This can make good use of the resources of the edge computing server and provide high-quality user experience for the service user.

However, patent 2 still cannot effectively solve the problem that a single edge computing server has a limited processing capability but is overloaded in burst-traffic scenarios and thus fails to respond to service requests timely.

The present invention provides a deep reinforcement learning-based information processing method and apparatus for an edge computing server, which can overcome the defects of the foregoing two patents.

The deep reinforcement learning-based information processing method and apparatus for the edge computing server is further described below according to the embodiments of the present invention.

In an embodiment, referring to FIG. 1. FIG. 1 is a first flow chart of a deep reinforcement learning-based information processing method for an edge computing server according to an embodiment of the present invention. As shown in FIG. 1, a resource processing method for an edge computing server in this embodiment of the present invention includes the following steps:

Step 100: determining whether a target edge computing server enters an alert state according to a quantity of service requests received by the target edge computing server within a preset time period; and if yes, performing step 102.

It should be noted that a MEC server group includes a plurality of edge computing servers, and each edge computing server is configured to process service requests in a region. For ease of description, the present invention uses an edge computing server in the MEC server group for description, and denotes this edge computing server as the target edge computing server. If no, returning to the step of determining whether the target edge computing server enters the alert state according to the quantity of service requests received by the target edge computing server within the preset time period.

In this step, it is determined whether the target edge computing server encounters a burst traffic event within the preset time period according to the quantity of service requests received by the target edge computing server within in this time period. If yes, subsequent steps are performed to alleviate a processing pressure of the target edge computing server and ensure the stability and high efficiency of the MEC server group.

Specifically, it is assumed that a quantity m of service requests that an edge computing server receives within a preset time period T under a normal circumstance obeys a Gaussian distribution with a mean of $\mu$ and a variance of $\sigma^2$, namely, m~N($\mu$, $\sigma$). When the quantity m of service requests received by the target edge computing server within the preset time period T meets m>$\mu+\xi_1\sigma$, it is considered that the target edge computing server encounters a burst traffic event such that the target edge computing server enters an alert state. When the quantity m of service requests received by the target edge computing server within the preset time period T meets m<$\mu+\xi_2\sigma$, it is considered that the burst traffic event encountered by the target edge computing server is already processed such that the target edge computing server leaves the alert state and returns to a normal state.

In actual applications, $\xi_1$ and $\xi_2$ can be set and modified according to an amount of computing resources and a processing capability of the edge computing server, while the mean $\mu$ and the variance $\sigma^2$ are obtained through long-term data statistics.

Step 102: obtaining preset system status information from a preset memory library.

The system status information includes processing capability information of each edge computing server in the MEC server group in which the target edge computing server is located.

In this step, after the target edge computing server enters the alert state, the preset system status information is obtained from the preset memory library such that a matched action is computed according to the obtained system status information in a subsequent step to alleviate the processing pressure of the target edge computing server.

It may be understood that an initial value of the system status information is initially stored in the preset memory library.

Optionally, the system status information includes a system status information data group $s_i$ of the MEC server group. The system status information data group $s_i$ is specifically expressed as the following formula (1):

$$s_i=\{c_i,v_i,w_i,d_i\} \quad (1)$$

where $c_i$ represents a remaining amount of resources of an $i^{th}$ edge computing server, $v_i$ represents a task processing velocity of the $i^{th}$ edge computing server or a quantity of instructions executed per unit time, $w_i$ represents data transmission bandwidth between the $i^{th}$ edge computing server and a burst traffic server, and $d_i$ represents an average transmission delay from the $i^{th}$ edge computing server to the burst traffic server.

It may be understood that the system status information includes the processing capability information of each edge computing server in the MEC server group in which the target edge computing server is located. Specifically, the processing capability information includes the remaining amount of resources, the task processing velocity, the quantity of instructions executed per unit time, the data transmission bandwidth, the average transmission delay, and other information that can reflect a current processing capability of each edge computing server in the MEC server group.

Step 104: computing an optimal action value corresponding to the target edge computing server based on a preset deep reinforcement learning model according to the system status information and preset strategy information.

The optimal action value includes the number of an edge computing server, other than the target edge computing server in the MEC server group, to which the service requests of the target edge computing server are transferred.

In this step, candidate action values corresponding to the target edge computing server may be first computed based on the preset deep reinforcement learning model according to the obtained system status information and the preset strategy information, and then the optimal action value corresponding to the target edge computing server is determined from the candidate action values. In this way, an action corresponding to the optimal action value is performed, an optimal adjustment effect is achieved to reduce the processing pressure of the target edge computing server.

It should be noted that the computed action value corresponding to the target edge computing server includes the number of the edge computing server, other than the target edge computing server in the MEC server group, to which the service requests of the target edge computing server are transferred. In this way, the service requests received by the target edge computing server can be transferred out by performing the action, so as to alleviate the processing pressure of the target edge computing server.

Step 106: generating an action corresponding to the target edge computing server according to the optimal action value, and performing the action on the target edge computing server.

In this step, the action corresponding to the action value is determined according to the computed action value and is performed on the target edge computing server to transfer the service requests received by the target edge computing server to the edge computing server other than the target edge computing server in the MEC server group, so as to alleviate the processing pressure of the target edge computing server.

It can be seen that in the present invention, when receiving a large quantity of service requests in a short period of time, the target edge computing server enters the alert state. In the alert state, the action value is computed through the preset deep reinforcement learning model, and the action corresponding to the action value is performed to transfer the received service requests to other edge computing server in the MEC server group in which the target edge computing server is located for processing. This reduces the pressure of the target edge computing server and improves the processing efficiency of the target edge computing server, so as to ensure the high efficiency and stability of the MEC server group.

Figure 2:
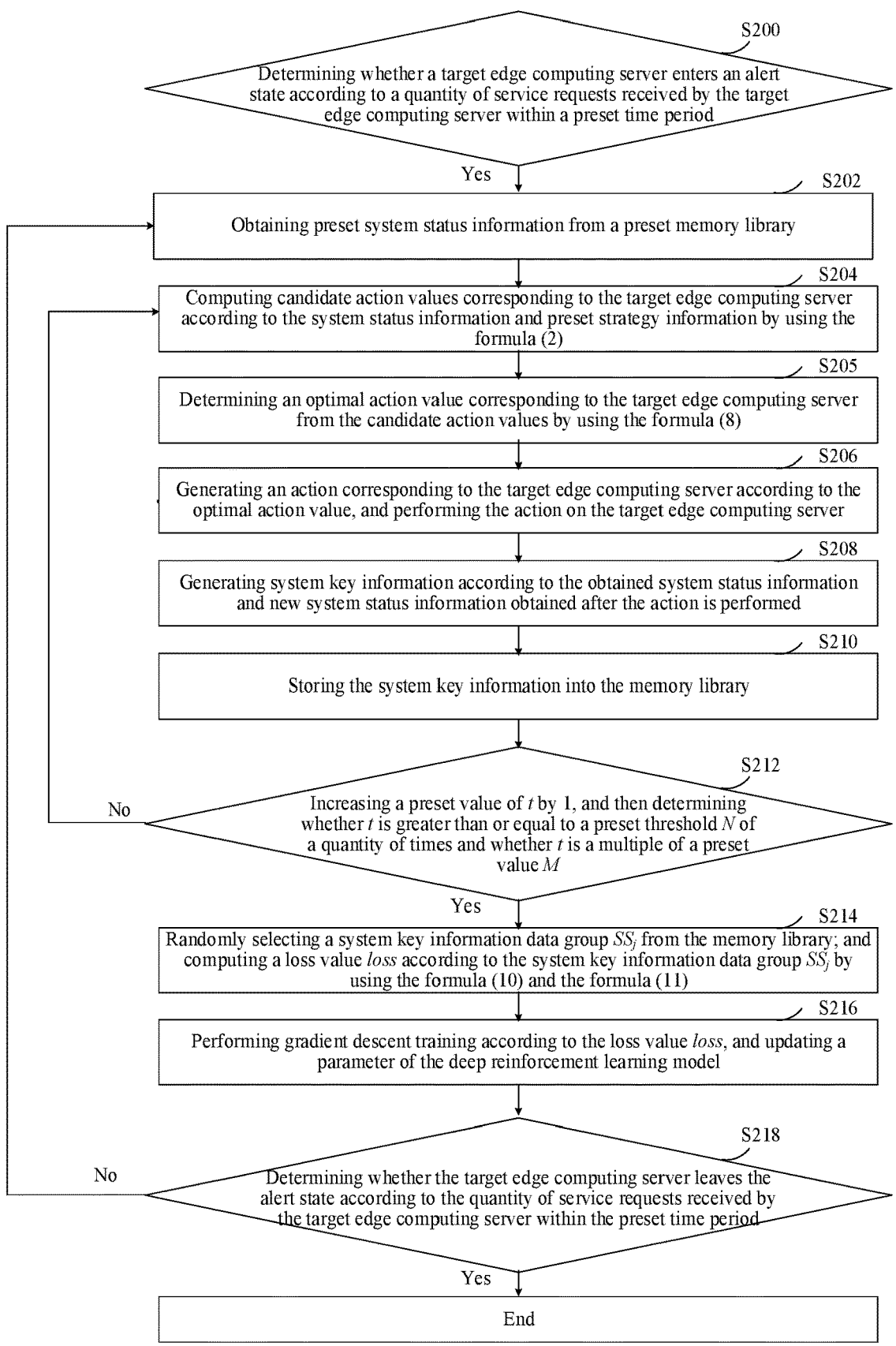
FIG. 2 is a second flow chart of a deep reinforcement learning-based information processing method for an edge computing server according to an embodiment of the present invention.

In another embodiment, referring to FIG. 2. FIG. 2 is a second flow chart of a deep reinforcement learning-based information processing method for an edge computing server according to an embodiment of the present invention. As shown in FIG. 2, the deep reinforcement learning-based information processing method for the edge computing server in this embodiment of the present invention includes the following steps:

Step 200: determining whether a target edge computing server enters an alert state according to a quantity of service requests received by the target edge computing server within a preset time period; and if yes, performing step 202.

Step 202: obtaining preset system status information from a preset memory library.

The above step 200 and step 202 may refer to step 100 and step 102 in the deep reinforcement learning-based information processing method for the edge computing server shown in FIG. 1, and thus are not described herein again.

Step 204: computing candidate action values corresponding to the target edge computing server according to the system status information and preset strategy information by using the formula (2).

Specifically, the candidate action values are calculated by the following formula (2):

$$q_\pi(s,a) = E_\pi[G_t \mid S_t = s, A_t = a] = E_\pi\left[\sum_{k=0}^{\infty} \gamma^k \cdot R_{t+k+1} \mid S_t = s\right] \quad (2)$$

where $q_\pi$, represents the action value, $\pi$ represents the preset strategy information, $S_t$ represents current system status information, $\alpha$ represents action information, $\gamma$ represents a reward discount factor, R represents a current reward value of a system, $G_t$ represents a current gain value of the system, t represents a count value of loop operations in the deep reinforcement learning model, the action $\alpha$ is performed once in one loop operation, and $E_\pi[G_t \mid S_t=s, A_t=\alpha]$ represents an expectation of the gain value $G_t$ when $S_t=s$, $A_t=\alpha$.

The strategy information refers to a conditional probability distribution of a status of a cluster at the moment tt adjusted by selecting different actions, and is expressed as the following formula (3):

$$\pi(\alpha|s)=P[\alpha_{tt}=\alpha|S_{tt}=s] \quad (3)$$

where $\pi(\alpha|s)$ represents the strategy information, $\alpha_{tt}$ represents action information at the moment tt, and $S_{tt}$ represents system status information at the moment tt.

The current reward value R of the system is calculated by the following formulas (4) to (6):

$$R = \begin{cases} 1, & load_{D(S_{tt})} < \beta \\ 0, & load_{C(S_{tt},a_{tt})} < 0 \\ -1, & load_{C(S_{tt},a_{tt})} \geq 0 \end{cases} \quad (4)$$

$$load\_D(s_t) = \max\{c_1, c_2, c_3, \ldots, c_n\} - \min\{c_1, c_2, c_3, \ldots, c_n\} \quad (5)$$

$$load\_C(s_t, a_t) = load\_D(s_{t+1} \mid s_t, a_t) - load\_D(s_t) \quad (6)$$

where R represents the current reward value of the system, $s_{tt}$ represents the status of the cluster at the moment tt, $\alpha_{tt}$ represents an action performed at the moment tt, load_D ($s_t$) represents the difference between the maximum load and the minimum load of the server in the cluster at the moment t, namely, a load imbalance degree, and load_C($s_t$, $\alpha_t$) represents a variation in the load imbalance degree after an action $\alpha_t$ is performed.

The current gain value $G_t$ of the system is computed by the following formula (7):

$$G_t = \Sigma_{k=0}^{\infty} \gamma^k \cdot R_{t+k+1} \quad (7)$$

where R represents the current reward value of the system, γ represents the reward discount factor (0<γ<1), t represents the count value of the loop operations in the deep reinforcement learning model, and the action α is performed once in one loop operation.

Step 205: determining an optimal action value corresponding to the target edge computing server from the candidate action values by using the formula (8).

Specifically, the optimal action value is computed by the following formula (8):

$$q_\pi(s,\alpha) \leftarrow q_\pi(s,\alpha) + \alpha \cdot [r + \gamma \cdot \max_a q_\pi(s',\alpha') - q_\pi(s,\alpha)] \quad (8)$$

where $q_\pi(s,\alpha)$ represents an optimal action value function, α represents update efficiency, r represents a currently returned reward value, γ represents the reward discount factor, max represents a maximum value, $\max_a q_\pi(s',\alpha')$ represents a maximum value of Q obtained after the system performs an action corresponding to an optimal action value α' in a state s', s' represents status information of next loop operation, a' represents action information of next loop operation, π represents the preset strategy information, and ← represents an assignment operator.

It should be noted that Q and q represent the same concept. In other words, the action value function is the value of q. The arrow represents updating the value of q, that is, the value of q is updated once in each loop operation. During specific computing, the arrow may be understood as an equal sign. In other words, a new value of Q is equal to $q_\pi + \alpha \cdot [r + \gamma \cdot \max x_{\alpha'} \cdot q_\pi(s',\alpha') - q_\pi(s,\alpha)]$.

Step 206: generating an action corresponding to the target edge computing server according to the optimal action value, and performing the action on the target edge computing server.

Step 208: generating system key information according to the obtained system status information and new system status information obtained after the action is performed.

In this step, after the action corresponding to the optimal action value is performed, the system status information may be changed. The new system status information after the change and the system status information obtained in step 202 are obtained to generate the system key information.

Optionally, the system key information includes a system key information data group $SS_t$:

$$SS_t = \{s_t, \alpha_t, r_t, s_{t+1}\} \quad (9)$$

where $\alpha_t$ represents action information, $r_t$ represents a reward value, which is the feedback given by an environment after the action α is performed, $s_t$ represents system status information before an action $\alpha_t$ is performed, $s_{t+1}$ represents system status information after the action $\alpha_t$ is performed, t represents the count value of the loop operations in the deep reinforcement learning model, and the action α is performed once in one loop operation.

It should be noted that the system key information includes not only system status information in a current loop operation, but also system status information in a previous loop operation. In this way, the system key information can reflect a recent variation in the system status information.

Step 210: storing the system key information into the memory library.

It should be noted that in this step, the system key information in the memory library is updated in each loop operation. In step 202, the system status information $s_t$ may alternatively be obtained from the system key information $SS_t$ in the memory library.

Step 212: increasing a preset value of t by 1, and then determining whether t is greater than or equal to a preset threshold N of a quantity of times and whether t is a multiple of a preset value M, if yes, performing step 214; and if no, returning to step 204.

t represents the count value of the loop operations in the deep reinforcement learning model. The action α is performed once in one loop operation. An initial value of t is 0.

In this step, the value of t is first increased by 1, and then it is determined whether t is greater than or equal to the preset threshold N of the quantity of times and whether t is the multiple of the preset value M. If these two conditions are met, a parameter of the deep reinforcement learning model is updated in a subsequent step.

Step 214: randomly selecting a system key information data group $SS_j$ from the memory library; and computing a loss value loss according to the system key information data group $SS_j$ by using the formula (10) and the formula (11).

$$G_j = \begin{cases} r_j & \text{if done at step } + 1 \\ r_j + \gamma \cdot \max a' \cdot q(s_{j+1}, a'; \theta') & \text{otherwise} \end{cases} \quad (10)$$

$$loss = (G_j - Q(s_j, a_j; \theta))^2 \quad (11)$$

where $G_j$ represents a target reference gain value computed through a neural network, if an algorithm ends in a next step, $G_j = r_j$, otherwise $G_j = r_j + \gamma \cdot \max \alpha' \cdot q_\pi(s_{j+1}, \alpha'; \theta')$, $r_j$ represents a reward value; γ represents the reward discount factor (0<γ<1), $SS_j = \{s_j, \alpha_j, r_j, s_{j+1}\}$, $G_j$ represents a target reward value, j represents the order of a step, step represents the step, $\max_a q_\pi(s_{j+1}, a'; \theta')$ represents a maximum value of Q obtained after the system performs the action corresponding to the optimal action value α' in a state $s_{j+1}$, $S_{j+1}$ represents status information of a (j+1)$^{th}$ step, θ' represents the parameter of the deep reinforcement learning model, loss represents a loss function, γ represents the reward discount factor, Q represents the action value function, $s_j$ represents status information in a $j^{th}$ step, and $\alpha_j$ represents action information.

$G_t$ represents the gain value computed through an original formula, and $G_j$ represents the target reference gain value computed through the neural network, both of which can be considered the same thing.

In the formulas (10) and (11), the parameter θ is a general reference for calling internal parameters of the neural network, and is adjusted and optimized by calling a library for training.

Step 216: performing gradient descent training according to the loss value loss, and updating the parameter of the deep reinforcement learning model.

It should be noted that the gradient descent training is performed by directly calling the library. Therefore, there is no specific description in the algorithm. Generally, the parameter is continuously adjusted to reduce the loss value loss until an error requirement is met.

Step 218: determining whether the target edge computing server leaves the alert state according to the quantity of service requests received by the target edge computing server with in the preset time period; if yes, ending the processing procedure; and if no, returning to step 202.

In this step, it is determined whether the target edge computing server can leave the alert state according to the quantity of service requests received by the target edge computing server with in the preset time period.

If yes, it is indicated that the target edge computing server currently has low processing pressure and can leave the alert state, and the processing procedure ends. If no, it is indicated that the target edge computing server currently still has high processing pressure, and the received service requests need to be diverted to other edge computing server to alleviate the processing pressure of the target edge computing server.

Specifically, the deep reinforcement learning-based information processing procedure for the edge computing server includes steps (1) to (19). This procedure can reflect code implementation of the processing method shown in FIG. 2.

Step (1): Initialize a parameter θ of a deep reinforcement learning model of eval_net Initialize a parameter θ' of a deep reinforcement learning model of target_net Initialize a memory library D step=0

Step (2): for each episode:

Step (3): t=0

Step (4): Obtain an initial state $s_t$=env. initialize of the system

Step (5): while (not done) do

Step (6): eval_net selects an action based on a state $$\text{action} = \begin{cases} a_t = \max_a Q^*(s_t, a; \theta), & \text{if random} \geq \varepsilon \\ \text{select a random action } a_t, & \text{otherwise} \end{cases}$$

Step (7): Perform an action $\alpha_t$, env return $s_{t+1}$, $r_t$(reward), done Step (8): Store $\{s_t, \alpha_t, r_t, s_{t+1}\}$ in the memory library D Step (9): if (step>N and step % M=0)

Step (10): Assign the parameter θ of eval_net to the parameter θ' of target_net

Step (11): Randomly select $\{s_i, \alpha_i, r_i, s_{i+1}\}$ from the memory library $$G_i = \begin{cases} r_i, & \text{if done at step} + 1 \\ r_i + \gamma \cdot \max a' Q(s_{i+1}, a'; \theta'), & \text{otherwise} \end{cases}$$

Step (12): loss=$(G_i - Q(s_i, \alpha_1; \theta))^2$, and perform gradient descent training based on the value of loss Update the parameter θ of the deep reinforcement learning model of eval_net Step (13): end if Step (14): step=step+1, t=t+1

Step (15): $s_t = s_{t+1}$

Step (16): if (done)

Step (17): break

Step (18): end while

Step (19): end for

Specifically, "eval_net selects an action based on a state" means that eval_net computes a predicted value of q based on the input state parameter and selects a corresponding action value α based on a maximum value of q.

It should be noted that in the processing procedure shown in the above, two variables t and step are used for counting. t is used to count the quantity of loop operations, and step is used to determine whether the parameter of the deep reinforcement learning model can be updated.

In conclusion, key technical features of the present invention are as follows:

(1) In the present invention, when the edge computing server encounters a burst traffic event, the MEC server group in which the edge computing server is located can be used as a cluster to perform unified resource scheduling and task allocation, so as to reduce the processing pressure of a single edge computing server.

(2) The present invention models the problem of processing the service requests by the edge computing server in burst-traffic scenarios to be a Markov decision process, and then defines concepts such as the status, action, strategy, and reward in the deep reinforcement learning model involved in this problem.

(3) The processing method in the present invention uses the model of the Markov decision process in combination with the deep reinforcement learning model to ensure the stability of the processing capability of the edge computing server for the service requests in the burst-traffic scenarios.

In addition, in order to prove the technical effect of the present invention, the present invention uses Python to build a simulation platform and implement the algorithm. Simulation experiments are also designed to compare the average response time to the service requests and the server loads of the algorithm with those of benchmark algorithms such as Markov approximation and exhaustive search. Simulation analysis shows that the processing method provided in the present invention has better performance than the benchmark algorithms in the burst-traffic scenarios.

The built simulation environment is briefly described below.

(1) The Python version is Python 3.5.6.

(2) The open source library and version used by the deep reinforcement learning model is TensorFlow 1.10.

(3) Simulation parameters: the quantity of tasks is 200, the quantity of servers in the cluster is 5, the size of the action space is 5, the learning efficiency α is 0.2, the discount factor γ is 0.9, epsilon-greedy is 0.9, and the size of the memory library is 2000.

Figure 3:
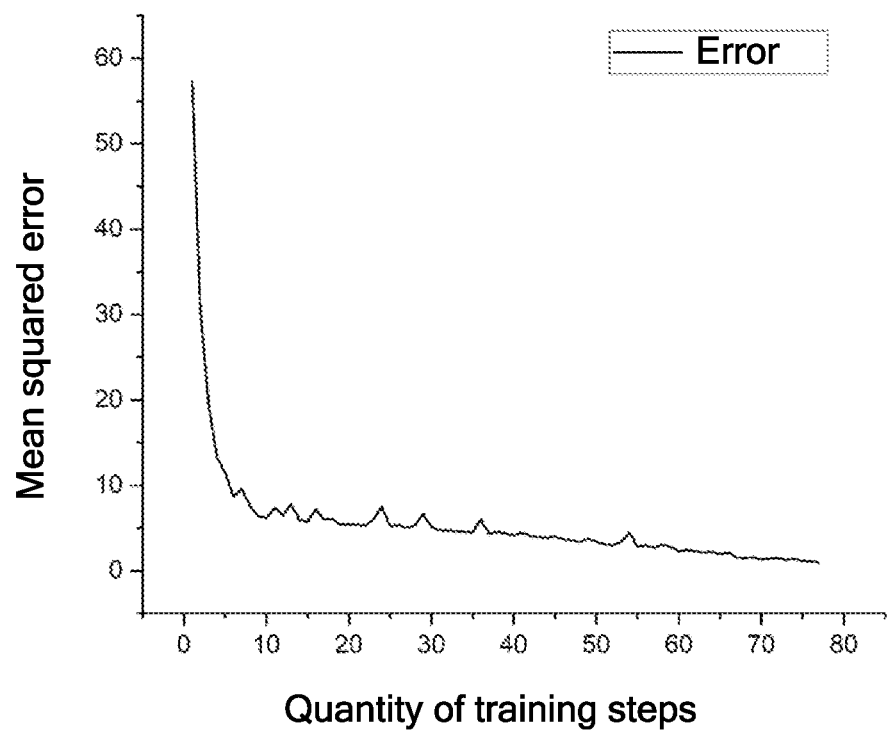
FIG. 3 is a schematic diagram of a loss function curve according to an embodiment of the present invention.

Specifically, in each round of the experiment, a burst-traffic scenario is triggered on a certain edge computing server to generate 200 random service requests, and the traffic is diverted by using the processing method in the present invention. A loss function curve obtained after 10 rounds of experimental training may refer to FIG. 3. FIG. 3 is a schematic diagram of the loss function curve in the present invention. FIG. 3 shows that the processing method in the present invention can implement fast convergence.

In order to evaluate the performance of the processing method in the present invention, results of the simulation experiments of the processing method in the present invention (as an experimental group) are compared with that of other four comparison algorithms (as control groups) for analysis. In each round of the experiment, the simulation environment randomly generates 200 service requests, and the copy.deepcopy function is adopted to copy the 200 requests into five copies to be respectively delivered to the experimental group and control groups for processing. Initial states of edge computing servers in the five groups are all the same. The experimental group uses the burst traffic-oriented edge computing server resource management algorithm, and the control groups uses four different algorithms, respectively.

(1) Markov method: an approximation algorithm based on the Markov approximation framework.

(2) Random method: randomly allocating service requests to each server in the cluster for processing.

(3) Exhaustive search: finding an optimal solution by computing the time taken for all actions.

(4) Local processing: processing all computing tasks by a local server that encounters a burst traffic event.

The experiments compare the time taken to handle the burst-traffic scenario, average response time of three types of service requests, average percentage of waiting time in processing time, and load of the server in the process of handling the burst-traffic scenario.

Figure 4A:
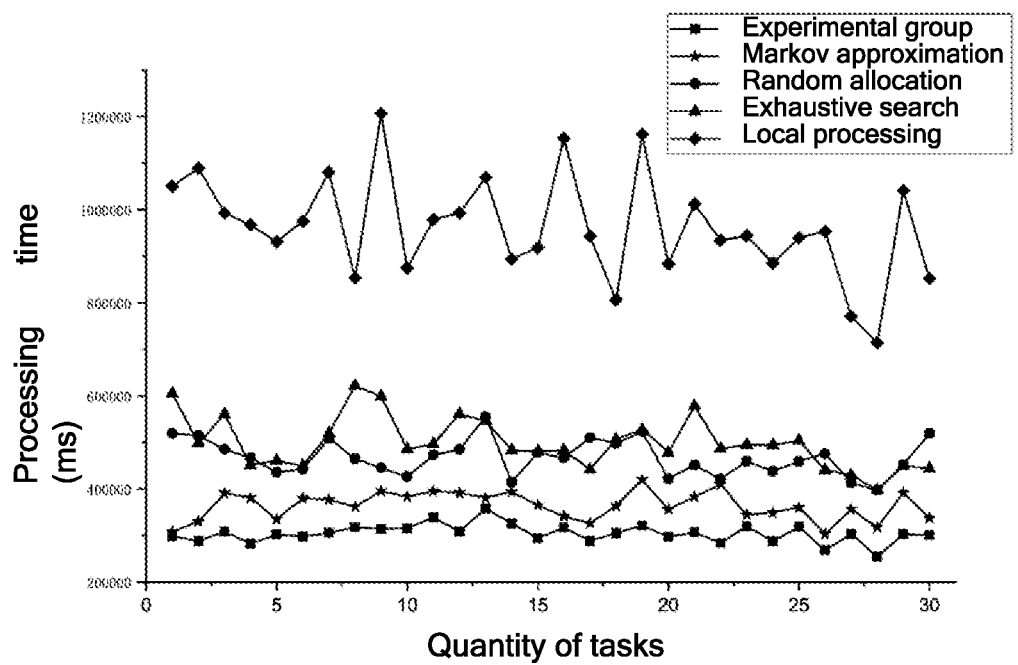
FIG. 4A is a schematic diagram of comparison between the time spent by an experimental group and the time spent by each control group according to an embodiment of the present invention.
Figure 4B:
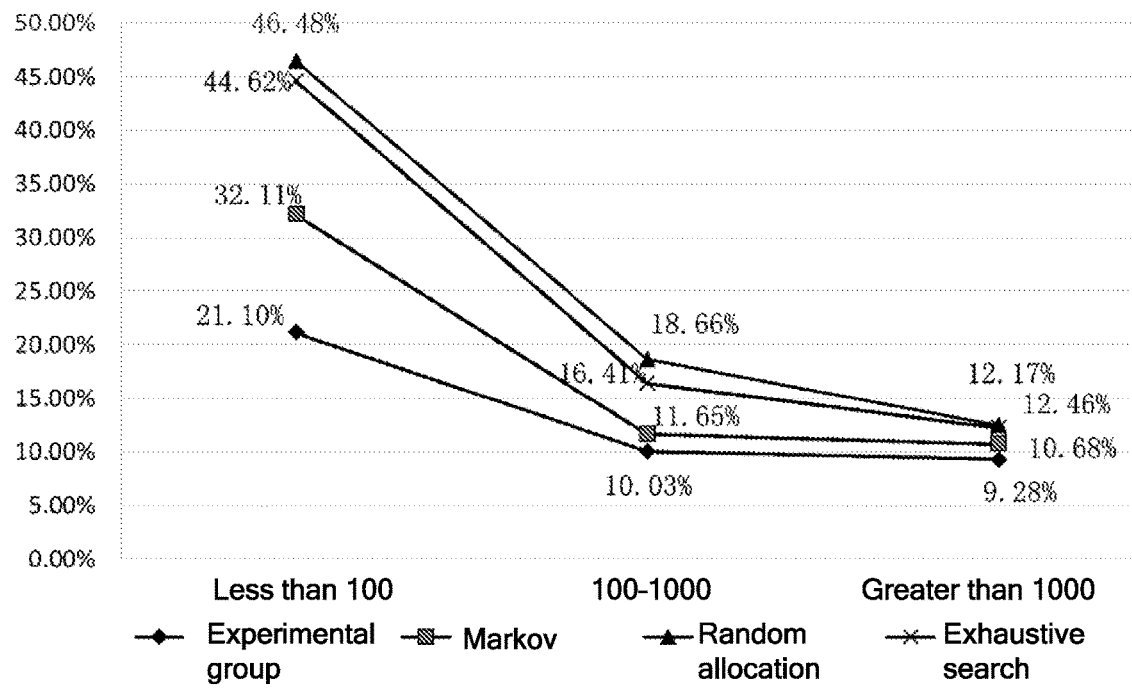
FIG. 4B is a line chart of percentage of waiting time of service requests in processing time according to an embodiment of the present invention.
Figure 4C:
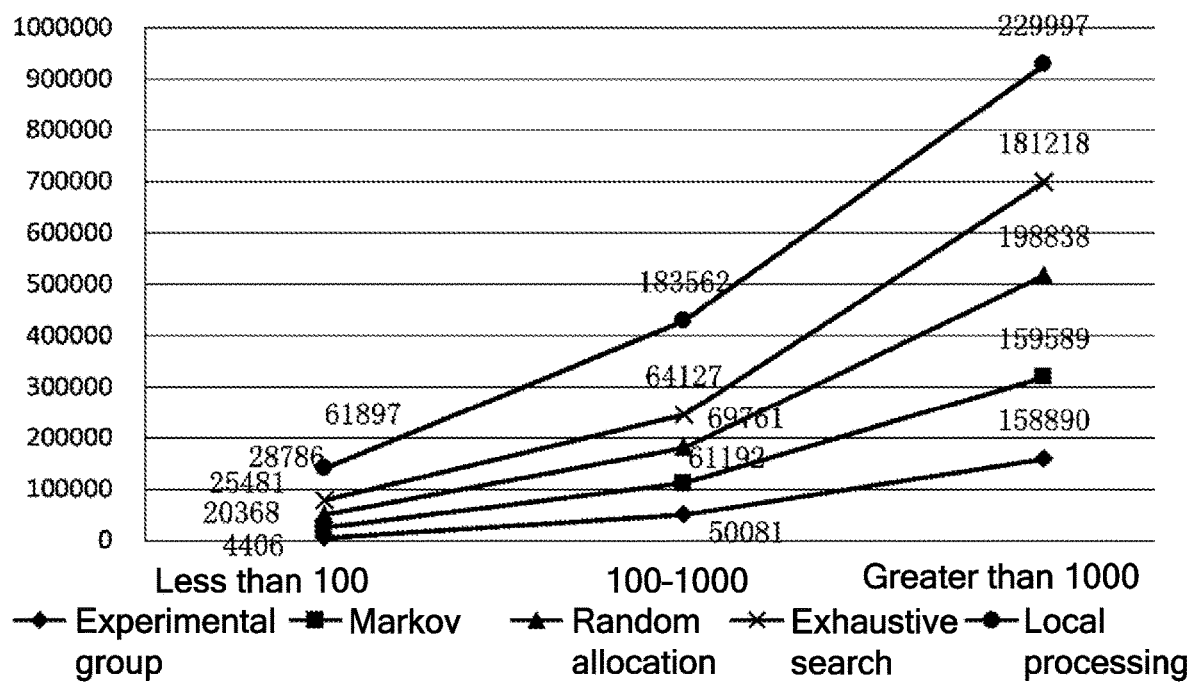
FIG. 4C is a line chart of accumulated response time of service requests according to an embodiment of the present invention.

Line charts of the time taken to completely process the 200 service requests in the burst-traffic scenario for the experimental group and each control group in 30 rounds of experiments may refer to FIG. 4A, FIG. 4B, and FIG. 4C. FIG. 4A is a schematic diagram of comparison between the time spent by the experimental group and the time spent by each control group according to the present invention. FIG. 4B is a line chart of percentage of waiting time of the service requests in processing time according to the present invention. FIG. 4C is a line chart of accumulated response time of the service requests according to the present invention.

As shown in FIG. 4A, FIG. 4B, and FIG. 4C, it can be clearly seen that the time spent by the experimental group using the algorithm designed in the present invention is significantly less than that of each control group. In the 30 times of experiments, the fluctuation of the time spent by the experimental group is also the smallest, which indicates that the experimental group has higher stability in the process of handling the burst-traffic scenario.

A deep reinforcement learning-based information processing apparatus for an edge computing server is described below according to the embodiments of the present invention.

Figure 5:
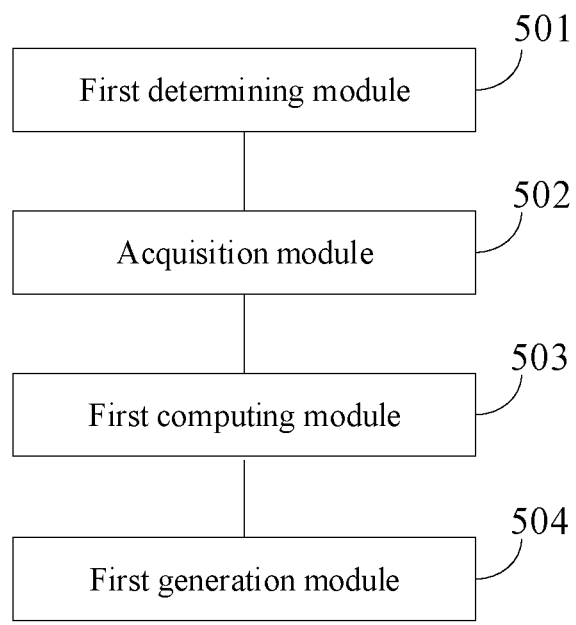
FIG. 5 is a schematic structural diagram of a deep reinforcement learning-based information processing apparatus for an edge computing server according to an embodiment of the present invention.

FIG. 5 is a schematic structural diagram of a deep reinforcement learning-based information processing apparatus for an edge computing server according to an embodiment of the present invention. The deep reinforcement learning-based information processing apparatus for the edge computing server provided in this embodiment of the present invention includes the following modules:

The first determining module 501 is configured to determine whether a target edge computing server enters an alert state according to a quantity of service requests received by the target edge computing server with in a preset time period.

The acquisition module 502 is configured to obtain preset system status information from a preset memory library if the first determining module determines that the target edge computing server enters the alert state, where the system status information includes processing capability information of each edge computing server in a MEC server group in which the target edge computing server is located.

The first computing module 503 is configured to compute an optimal action value corresponding to the target edge computing server based on a preset deep reinforcement learning model according to the system status information and preset strategy information, where the optimal action value includes the number of an edge computing server, other than the target edge computing server in the MEC server group, to which the service requests of the target edge computing server are transferred.

The first generation module 504 is configured to generate an action corresponding to the target edge computing server according to the optimal action value, and perform the action on the target edge computing server.

Optionally, the system status information includes a system status information data group $s_i$ of the MEC server group.

$$s_i = \{c_i, v_i, w_i, d_i\}$$

where $c_i$ represents a remaining amount of resources of an $i^{th}$ edge computing server, $v_i$ represents a task processing velocity of the $i^{th}$ edge computing server, $w_i$ represents data transmission bandwidth between the $i^{th}$ edge computing server and a burst traffic server, and $d_i$ represents an average transmission delay from the $i^{th}$ edge computing server to the burst traffic server.

Optionally, the first computing module 503 specifically includes:

a computing submodule, configured to compute candidate action values corresponding to the target edge computing server according to the system status information and the preset strategy information by the following formula:

$$q_\pi(s, a) = E_\pi[G_t \mid S_t = s, A_t = a] = E_\pi\left[\sum_{k=0}^{\infty} \gamma^k \cdot R_{t+k+1} \mid S_t = s\right]$$

where $q_\pi$ represents a candidate action value function, $\pi$ represents the preset strategy information, $S_t$ represents current system status information, s represents current status information, $\alpha$ represents current action information, $A_t$ represents current action information, $E_\pi$ represents an expectation of a gain value $G_t$, k represents a quantity of times, $\gamma$ represents a reward discount factor, R represents a current reward value of a system, $G_t$ represents a current gain value of the system, t represents a count value of loop operations in the deep reinforcement learning model, and the action $\alpha$ is performed once in one loop operation; and a determining submodule, configured to determine the optimal action value corresponding to the target edge computing server from the candidate action values by the following formula:

$$q_\pi(s,\alpha) \leftarrow q_\pi(s,\alpha) + \alpha \cdot [r + \gamma \cdot \max_a q_\pi(s',\alpha') - q_\pi(s,\alpha)]$$

where $q_\pi(s,\alpha)$ represents an optimal action value function, $\alpha$ represents update efficiency, r represents a currently returned reward value, $\gamma$ represents the reward discount factor, max represents a maximum value, $\max_a q_\pi(s',\alpha')$ represents a maximum value of Q obtained after the system performs an action corresponding to an optimal action value $\alpha'$ in a state s', s' represents status information of next loop operation, a' represents action information of next loop operation, $\pi$ represents the preset strategy information, and $\leftarrow$ represents an assignment operator.

Optionally, the apparatus further includes:

a second generation module, configured to generate system key information according to the obtained system status information and new system status information obtained after the action is performed; and a storage module, configured to store the system key information into the memory library.

Optionally, the system key information includes a system key information data group $SS_t$:

$$SS_t = \{s_t, \alpha_t, r_t, s_{t+1}\}$$

where $\alpha_t$ represents action information, $r_t$ represents a reward value, $s_t$ represents system status information before an action $\alpha_t$ is performed, $s_{t+1}$ represents system status information after the action $\alpha_t$ is performed, t represents the count value of the loop operations in the deep reinforcement learning model, and the action $\alpha$ is performed once in one loop operation.

Optionally, the apparatus further includes:

a second determining module, configured to increase a preset value of t by 1, and then determine whether t is greater than or equal to a preset threshold N of the quantity of times and whether t is a multiple of a preset value M, where an initial value of t is 0;

a second computing module, configured to randomly select a system key information data group $SS_j$ from the memory library if the second determining module determines that t is greater than or equal to the preset threshold N of the quantity of times and t is the multiple of the preset value M; compute a loss value loss according to the system key information data group $SS_j$ by the following formulas; and perform gradient descent training according to the loss value loss, and update a parameter of the deep reinforcement learning model;

$$G_j = \begin{cases} r_j & \text{if done at step} + 1 \\ r_j + \gamma \cdot \max a' \cdot q(s_{j+1}, a'; \theta') & \text{otherwise} \end{cases}$$

$$\text{loss} = (G_j - Q(s_j, a_j; \theta))^2$$

where if a processing procedure ends in a next step, $G_j = r_j$; if the processing procedure does not end in the next step, $G_j = r_j + \gamma \cdot \max \alpha' \cdot q(s_{j+1}, \alpha'; \theta')$, and $SS_j = \{s_j, \alpha_j, r_j, s_{j+1}\}$; and $G_j$ represents a target gain value, $r_j$ represents a reward value, j represents the order of a step, step represents the step, $\max_a q_\pi(s_{j+1}, a'; \theta')$ represents a maximum value of Q obtained after the system performs an action corresponding to an optimal action value $\alpha'$ in a state $s_{j+1}$, $s_{j+1}$ represents status information in a $(j+1)^{th}$ step, $\theta'$ represents the parameter of the deep reinforcement learning model, loss represents a loss function, $\gamma$ represents the reward discount factor, Q represents an action value function, $s_j$ represents status information in a $j^{th}$ step, and $a_j$ represents action information; and a first returning module, configured to return to the first computing module if the second determining module determines that t is less than the preset threshold N of the quantity of times, or t is not the multiple of the preset value M.

Optionally, the apparatus further includes:

a third determining module, configured to determine whether the target edge computing server leaves the alert state according to the quantity of service requests received by the target edge computing server with in the preset time period;

an end module, configured to end the processing procedure if the third determining module determines that the target edge computing server leaves the alert state; and a second returning module, configured to return to the acquisition module if the third determining module determines that the target edge computing server does not leave the alert state.

It can be seen that in the present invention, when receiving a large quantity of service requests in a short period of time, the target edge computing server enters the alert state. In the alert state, the action value is computed through the preset deep reinforcement learning model, and the action corresponding to the action value is performed to transfer the received service requests to other edge computing server in the MEC server group in which the target edge computing server is located for processing. This reduces the pressure of the target edge computing server and improves the processing efficiency of the target edge computing server, so as to ensure the high efficiency and stability of the MEC server group.

An electronic device is described below according to the embodiments of the present invention.

Figure 6:
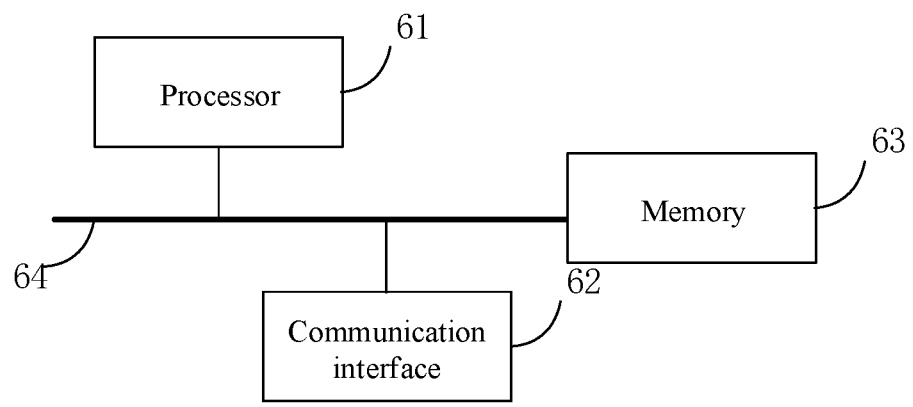
FIG. 6 is a schematic structural diagram of an electronic device according to an embodiment of the present invention.

FIG. 6 is a schematic structural diagram of an electronic device according to an embodiment of the present invention. An embodiment of the present invention further provides an electronic device, including the processor 61, the communication interface 62, the memory 63 and the communication bus 64. The processor 61, the communication interface 62 and the memory 63 communicate with each other through the communication bus 64.

The memory 63 is configured to store a computer program.

The processor 61 is configured to execute the program stored in the memory 63 to implement the steps of the foregoing deep reinforcement learning-based information processing method for the edge computing server. In a possible implementation of the present invention, the following steps may be implemented:

determining whether a target edge computing server enters an alert state according to a quantity of service requests received by the target edge computing server with in a preset time period;

if yes, obtaining preset system status information from a preset memory library, where the system status information includes processing capability information of each edge computing server in a MEC server group in which the target edge computing server is located;

computing an action value corresponding to the target edge computing server based on a preset deep reinforcement learning model according to the system status information and preset strategy information, where the action value includes the number of an edge computing server, other than the target edge computing server in the MEC server group, to which the service requests of the target edge computing server are transferred; and generating an action corresponding to the target edge computing server according to the action value, and performing the action on the target edge computing server.

The communication bus in the foregoing electronic device may be a peripheral component interconnect (PCI) bus, an extended industry standard architecture (EISA) bus, or the like. The communication bus may be classified as an address bus, a data bus, a control bus, or the like. For ease of representation, only one thick line is used to represent the communication bus in the FIG. 6, but this does not mean that there is only one bus or only one type of bus.

The communication interface is used for communication between the foregoing electronic device and other device.

The memory includes a random access memory (RAM) or a non-volatile memory (NVM), for example, at least one magnetic disk memory. Optionally, the memory may alternatively be at least one storage apparatus located far away from the foregoing processor.

The foregoing processor may be a general-purpose processor, including a central processing unit (CPU), a network processor (NP), or the like; or it may be a digital signal processor (DSP), an application-specific integrated circuit (ASIC), a field-programmable gate array (FPGA) or other programmable logic device, a discrete gate, a transistor logic device, or a discrete hardware component.

The method provided in the embodiments of the present invention can be applied to the electronic device. Specifically, the electronic device may be a desktop computer, a portable computer, a smart mobile terminal, a server, or the like. This is not limited herein. Any electronic device that can implement the embodiments of the present invention shall fall with in the scope of protection of the present invention.

An embodiment of the present invention provides a computer-readable storage medium. A computer program is stored in the computer-readable storage medium, and the computer program is configured to be executed by a processor to implement the steps of the foregoing deep reinforcement learning-based information processing method for the edge computing server.

An embodiment of the present invention provides a computer program product containing an instruction, and the instruction is configured to be run on a computer to cause the computer to perform the steps of the foregoing deep reinforcement learning-based information processing method for the edge computing server.

An embodiment of the present invention provides a computer program, and the computer program is configured to be run on a computer to cause the computer to perform the steps of the foregoing deep reinforcement learning-based information processing method for the edge computing server.

It should be noted that relational terms herein such as first and second are merely used to distinguish one entity or operation from another entity or operation, with out necessarily requiring or implying any actual such relationship or order between such entities or operations. In addition, terms "include", "contain", or any other variations thereof are intended to cover non-exclusive inclusions, such that a process, a method, an article, or a device including a series of elements not only includes those elements, but also includes other elements that are not explicitly listed, or also includes inherent elements of the process, the method, the article, or the device. Without more restrictions, the elements defined by the sentence "including a . . . " do not exclude the existence of other identical elements in the process, method, article, or device including the elements.

Each embodiment in this specification is described in a related manner, each embodiment focuses on the difference from other embodiments, and the same and similar parts between the embodiments may refer to each other. In particular, the embodiments of the apparatus, the electronic device, the storage medium, the computer program product containing an instruction, and the computer program are basically similar to the embodiments of the method, and thus are described in a relatively simple way. For their related parts, refer to the part of the description of the embodiments of the method.

The above merely describes the preferred embodiments of the present invention, which are not intended to limit the scope of protection of the present invention. Any modifications, equivalent substitutions, and improvements made with in the spirit and scope of the present invention shall fall with in the scope of protection of the present invention.

What is claimed is:

1. A deep reinforcement learning-based information processing method for an edge computing server, comprising:
    determining whether a target edge computing server enters an alert state according to a quantity of service requests received by the target edge computing server with in a preset time period;
    when the target edge computing server enters the alert state, obtaining preset system status information from a preset memory library, wherein the preset system status information comprises processing capability information of each edge computing server in a mobile edge computing (MEC) server group, wherein the target edge computing server is located in the MEC server group;
    computing an optimal action value corresponding to the target edge computing server based on a preset deep reinforcement learning model according to the preset system status information and preset strategy information, wherein the optimal action value comprises a number of an edge computing server other than the target edge computing server in the MEC server group, wherein the service requests of the target edge computing server are transferred to the edge computing server other than the target edge computing server; and
    generating an action corresponding to the target edge computing server according to the optimal action value, and performing the action on the target edge computing server,
    wherein the preset system status information comprises a system status information data group $s_i$ of the MEC server group:

$$s_i = \{c_i, v_i, w_i, d_i\}$$

wherein $c_i$ represents a remaining amount of resources of an $i^{th}$ edge computing server, $v_i$ represents a task processing velocity of the $i^{th}$ edge computing server, $w_i$ represents data transmission bandwidth between the $i^{th}$ edge computing server and a burst traffic server, and $d_i$ represents an average transmission delay from the $i^{th}$ edge computing server to the burst traffic server.

2. The deep reinforcement learning-based information processing method according to claim 1, wherein the step of computing the optimal action value corresponding to the target edge computing server based on the preset deep reinforcement learning model according to the preset system status information and the preset strategy information comprises:
    computing candidate action values corresponding to the target edge computing server according to the preset system status information and the preset strategy information by the following formula:

$$q_\pi(s, a) = E_\pi[G_t \mid S_t = s, A_t = a] = E_\pi\left[\sum_{k=0}^{\infty} \gamma^k \cdot R_{t+k+1} \mid S_t = s\right]$$

wherein $q_\pi$ represents a candidate action value function, $\pi$ represents the preset strategy information, $S_t$ represents current system status information, S represents current status information, a represents a current action, $A_t$ represents current action information, $E_\pi$ represents an expectation of a current gain value $G_t$, k represents a quantity of times, $\gamma$ represents a reward discount factor, R represents a current reward value of a system, $G_t$ represents the current gain value of the system, t represents a count value of loop operations in the preset deep reinforcement learning model, and the current action α is performed once in one loop operation; and determining the optimal action value corresponding to the target edge computing server from the candidate action values by the following formula:

$$q_\pi(s,\alpha) \leftarrow q_\pi(s,\alpha) + a \cdot [r + \gamma \cdot \max_\alpha q_\pi(s',\alpha') - q_\pi(s,\alpha)]$$

wherein $q_\pi(s, \alpha)$ represents an optimal action value function, α represents update efficiency, r represents a currently returned reward value, γ represents the reward discount factor, max represents a maximum value, $\max_a q_\pi(s',\alpha')$ represents a maximum value of Q obtained after the system performs an action corresponding to an optimal action value α' in a state s', s' represents status information of next loop operation, α' represents action information of next loop operation, π represents the preset strategy information, and ← represents an assignment operator.

3. The deep reinforcement learning-based information processing method according to claim 1, after the step of performing the action on the target edge computing server, further comprising:
generating system key information according to the preset system status information and new system status information obtained after the action is performed; and
storing the system key information into the memory library.

4. A deep reinforcement learning-based information processing method for an edge computing server, comprising:
determining whether a target edge computing server enters an alert state according to a quantity of service requests received by the target edge computing server with in a preset time period;
when the target edge computing server enters the alert state, obtaining preset system status information from a preset memory library, wherein the preset system status information comprises processing capability information of each edge computing server in a mobile edge computing (MEC) server group, wherein the target edge computing server is located in the MEC server group;
computing an optimal action value corresponding to the target edge computing server based on a preset deep reinforcement learning model according to the preset system status information and preset strategy information, wherein the optimal action value comprises a number of an edge computing server other than the target edge computing server in the MEC server group, wherein the service requests of the target edge computing server are transferred to the edge computing server other than the target edge computing server;
generating an action corresponding to the target edge computing server according to the optimal action value, and performing the action on the target edge computing server;
after the step of performing the action on the target edge computing server:
generating system key information according to the preset system status information and new system status information obtained after the action is performed; and
storing the system key information into the memory library, wherein the system key information comprises a system key information data group $SS_t$:

$$SS_t = \{s_t, \alpha_t, r_t, s_{t+1}\}$$

wherein $\alpha_t$ represents action information for an action α, $r_t$ represents a reward value, $s_t$ represents system status information before an action at is performed, $s_{t+1}$ represents system status information after the action $\alpha_t$ is performed, t represents a count value of loop operations in the preset deep reinforcement learning model, and the action α is performed once in one loop operation.

5. The deep reinforcement learning-based information processing method according to claim 4, after the step of storing the system key information into the memory library, further comprising:
increasing a preset value of t by 1, and then determining whether t is greater than or equal to a preset threshold N of a quantity of times and whether t is a multiple of a preset value M, wherein an initial value of t is 0;
when t is greater than or equal to the preset threshold N of the quantity of times and t is the multiple of the preset value M, randomly selecting a system key information data group $SS_j$ from the memory library; computing a loss value loss according to the system key information data group $SS_j$ by the following formulas; and performing gradient descent training according to the loss value loss, and updating a parameter of the preset deep reinforcement learning model:

$$G_j = \begin{cases} r_j & \text{if done at step} + 1 \\ r_j + \gamma \cdot \max a' q(s_{j+1}, a'; \theta') & \text{otherwise} \end{cases}$$

$$\text{loss} = (G_j - Q(s_j, a_j; \theta))^2$$

wherein when a processing procedure ends in a next step, $G_j = r_j$; when the processing procedure does not end in the next step, $G_j = r_j$; if the processing procedure does not end in the next step, $G_j = r_j + \gamma \cdot \max_{\alpha'} \cdot q(s_{j+1}, \alpha'; \theta')$, and $SS_j = \{s_j, \alpha_j, r_j, s_{j+1}\}$; and $G_j$ represents a target gain value, $r_j$ represents a reward value of a system, step j represents an order of a given step, step represents the given step, $\max_a q_\pi(s',\alpha')$ represents a maximum value of Q obtained after the system performs an action corresponding to an optimal action value α' in a state $s_{J+1}$, $s_{j+1}$ represents status information in a $(j+1)^{th}$ step, θ' represents the parameter of the preset deep reinforcement learning model, loss represents a loss function, γ represents a reward discount factor, Q represents an action value function, represents $S_j$ status information in a $j^{th}$ step, and $\alpha_j$ represents action information; and
when t is less than the preset threshold N of the quantity of times, or t is not the multiple of the preset value M, returning to the step of computing the optimal action value corresponding to the target edge computing server based on the preset deep reinforcement learning model according to the preset system status information and the preset strategy information.

6. The deep reinforcement learning-based information processing method according to claim 5, after the step of performing gradient descent training according to the loss value loss, and updating the parameter of the preset deep reinforcement learning model, further comprising:
determining whether the target edge computing server leaves the alert state according to the quantity of service requests received by the target edge computing server with in the preset time period;

when the target edge computing server leaves the alert state, ending the processing procedure; and when the target edge computing server does not leave the alert state, returning to the step of obtaining the preset system status information from the preset memory library.

7. A deep reinforcement learning-based information processing apparatus for an edge computing server, comprising:
a first determining module, implemented by at least one processor, configured to determine whether a target edge computing server enters an alert state according to a quantity of service requests received by the target edge computing server with in a preset time period;
an acquisition module, implemented by the at least one processor, configured to obtain preset system status information from a preset memory library when the first determining module determines that the target edge computing server enters the alert state, wherein the preset system status information comprises processing capability information of each edge computing server in a mobile edge computing (MEC) server group, wherein the target edge computing server is located in the MEC server group;
a first computing module, implemented by the at least one processor, configured to compute an optimal action value corresponding to the target edge computing server based on a preset deep reinforcement learning model according to the preset system status information and preset strategy information, wherein the optimal action value comprises a number of an edge computing server other than the target edge computing server in the MEC server group, wherein the service requests of the target edge computing server are transferred to the edge computing server other than the target edge computing server; and
a first generation module, implemented by the at least one processor, configured to generate an action corresponding to the target edge computing server according to the optimal action value, and perform the action on the target edge computing server,
wherein the preset system status information comprises a system status information data group $s_i$ of the MEC server group:

$$s_i = \{c_i, v_i, w_i, d_i\}$$

wherein $c_i$ represents a remaining amount of resources of an $i^{th}$ edge computing server, $v_i$ represents a task processing velocity of the $i^{th}$ edge computing server, $w_i$ represents data transmission bandwidth between the $i^{th}$ edge computing server and a burst traffic server, and $d_j$ represents an average transmission delay from the $i^{th}$ edge computing server to the burst traffic server.

8. The deep reinforcement learning-based information processing apparatus according to claim 7, wherein the first computing module comprises:
a computing submodule, implemented by the at least one processor, configured to compute candidate action values corresponding to the target edge computing server according to the preset system status information and the preset strategy information by the following formula:

$$q_\pi(s, a) = E_\pi[G_t | S_t = s, A_t = a] = E_\pi\left[\sum_{k=0}^{\infty} \gamma^k \cdot R_{t+k+1} | S_t = s\right]$$

wherein $q\pi$ represents a candidate action value function, $\pi$ represents the preset strategy information, $S_t$ represents current system status information, S represents current status information, $\alpha$ represents a current action, $A_t$ represents current action information, $E_\pi$ represents an expectation of a current gain value $G_t$, k represents a quantity of times, $\gamma$ represents a reward discount factor, R represents a current reward value of a system, $G_t$ represents the current gain value of the system, t represents a count value of loop operations in the preset deep reinforcement learning model, and the current action $\alpha$ is performed once in one loop operation; and
a determining submodule, implemented by the at least one processor, configured to determine the optimal action value corresponding to the target edge computing server from the candidate action values by the following formula:

$$q_\pi(s,\alpha) \leftarrow q_\pi(s,\alpha) + a \cdot [r + \gamma \cdot \max_\alpha q_\pi(s',\alpha') - q_\pi(s,\alpha)]$$

wherein $q\pi(s,a)$ represents an optimal action value function, $\alpha$ represents update efficiency, r represents a currently returned reward value, $\gamma$ represents the reward discount factor, max represents a maximum value, $\max_a q_\pi(s',\alpha')$ represents a maximum value of Q obtained after the system performs an action corresponding to an optimal action value $\alpha'$ in a state s',s' represents status information of next loop operation, $\alpha'$ represents action information of next loop operation, $\pi$ represents the preset strategy information, and $\leftarrow$ represents an assignment operator.

* * * * *